Patented Mar. 21, 1939

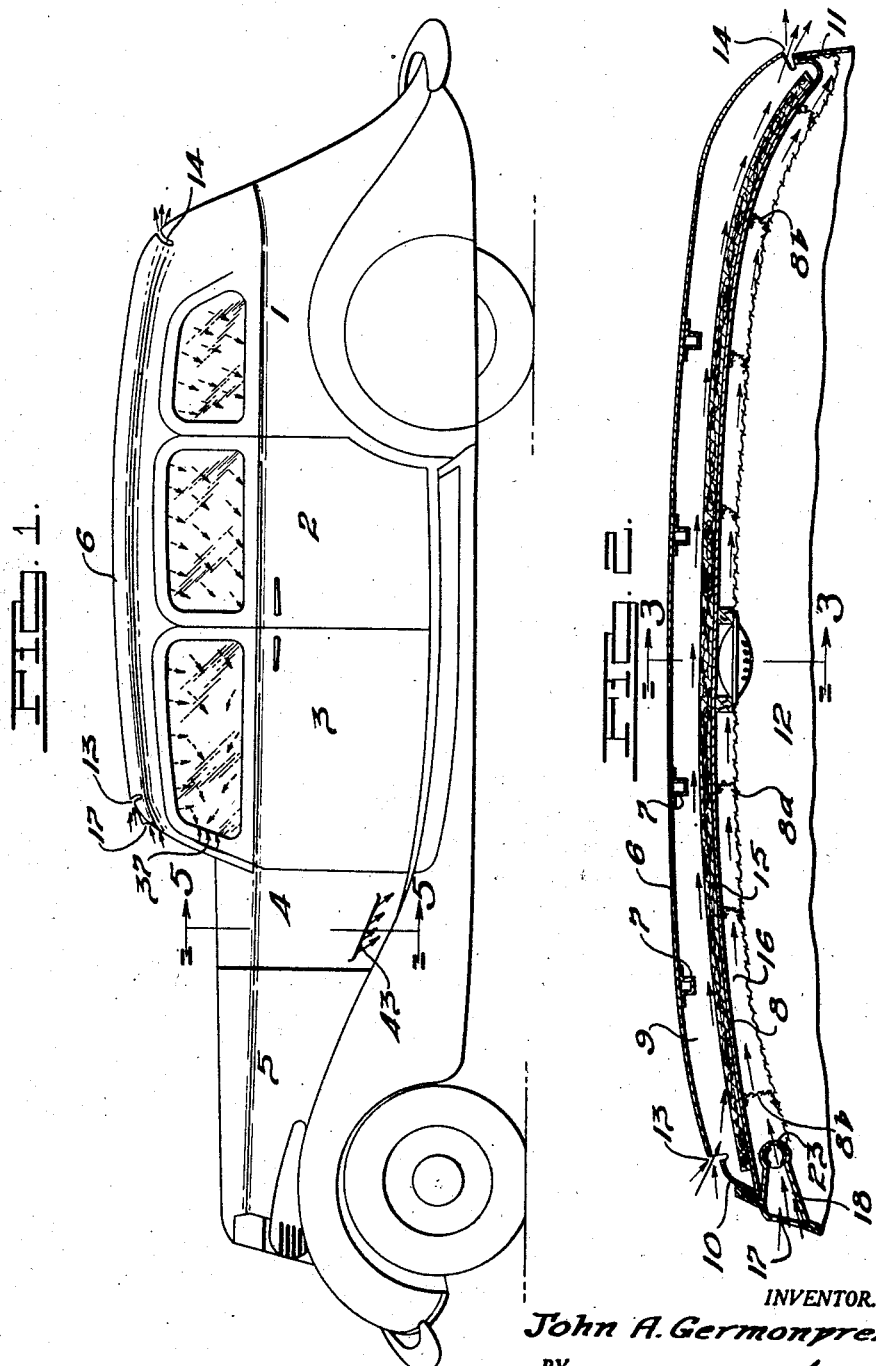

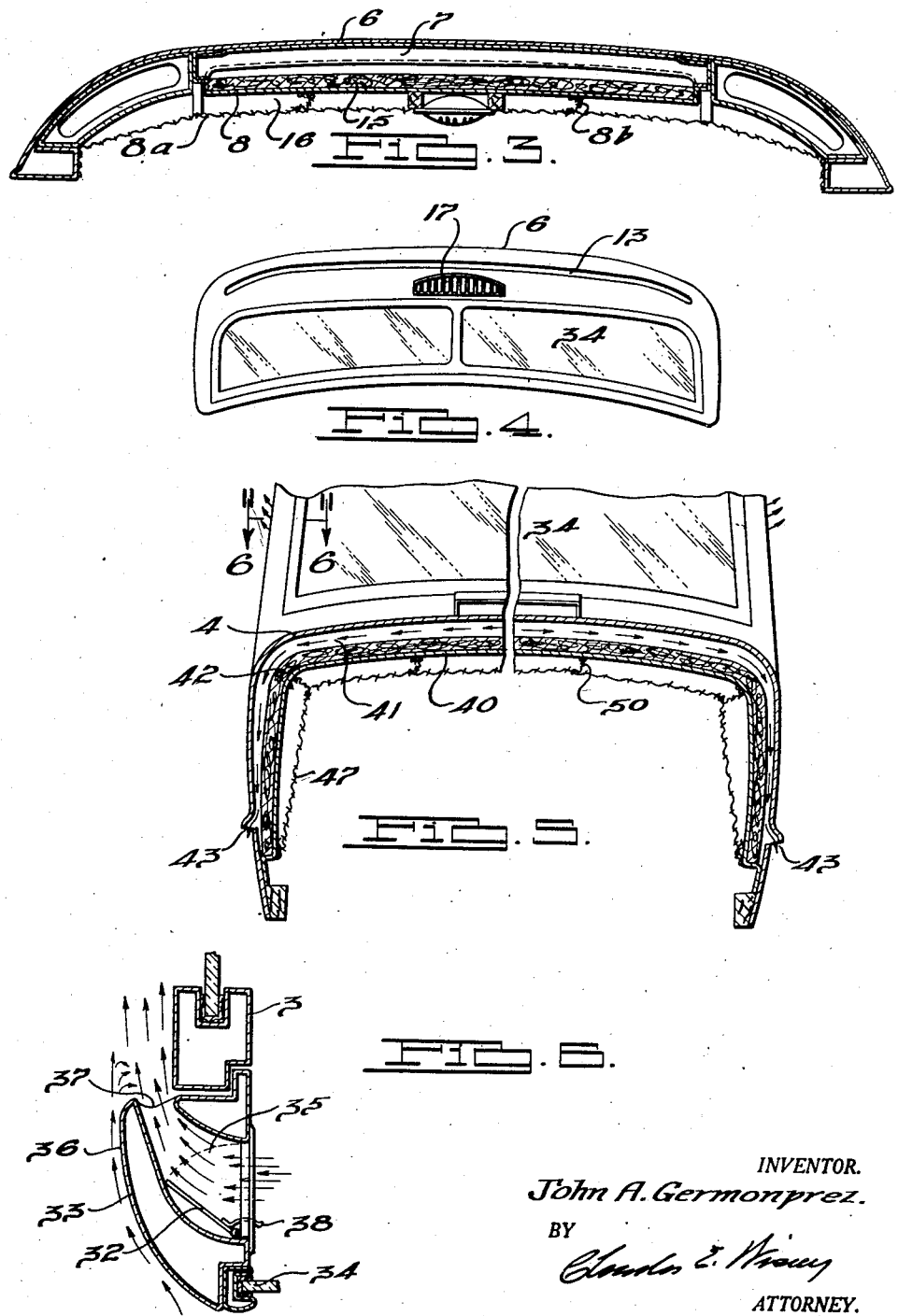

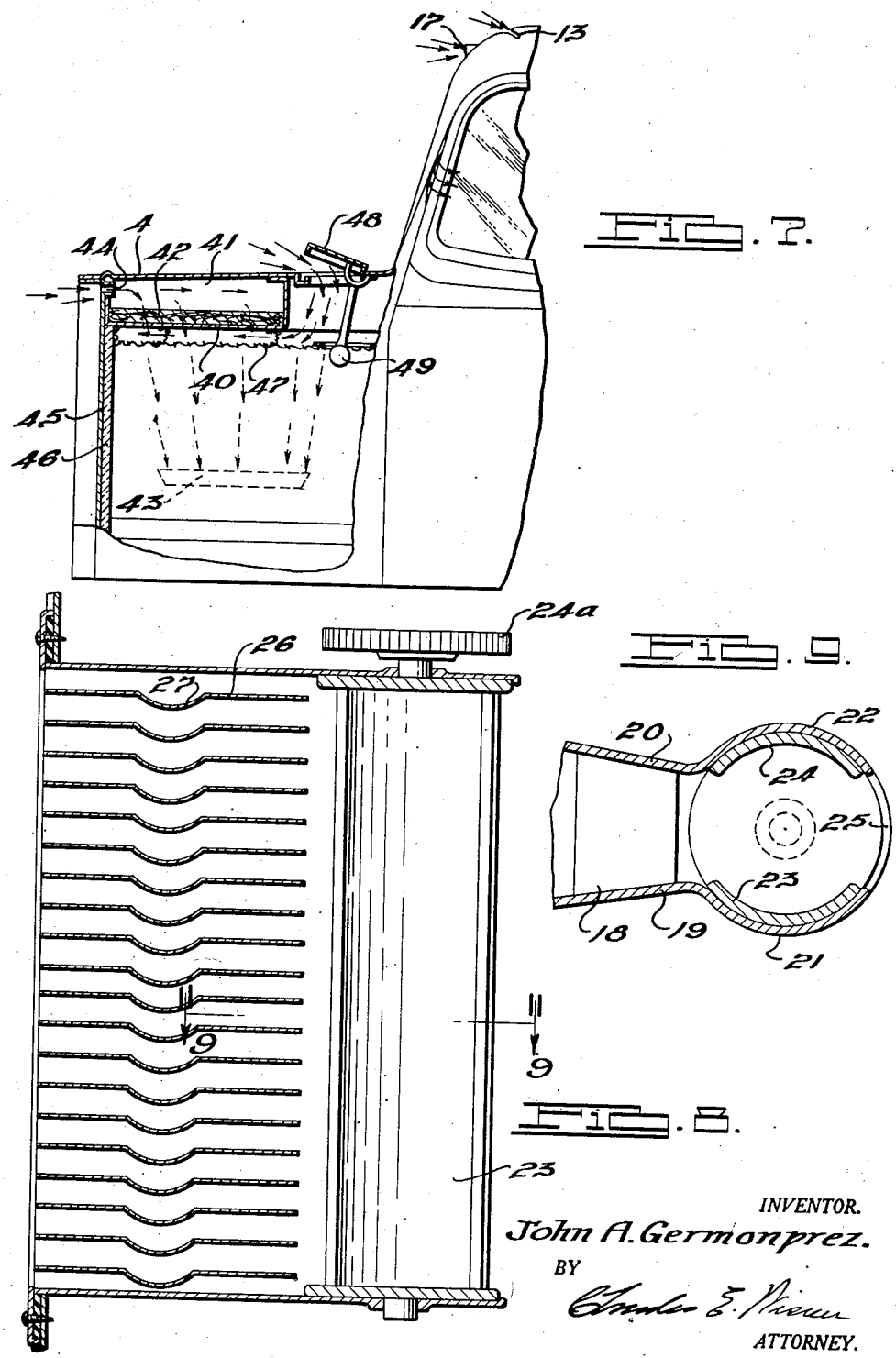

2,151,097

UNITED STATES PATENT OFFICE 2,151,097

MEANS AND METHOD FOR COOLING VEHICLE BODIES

John A. Germonprez, Detroit, Mich., assignor to Evans Products Company, Detroit, Mich., a corporation of Delaware Application September 9, 1935, Serial No. 39,680

19 Claims. (Cl. 62—139)

This invention relates to means for cooling an enclosed space, the object being to provide a new and improved structure and method by which the temperature of an enclosed space may be maintained below that of surrounding atmosphere and the invention may be embodied in various types of structures as an automobile or other public conveyance such as railroad cars, busses, etc., as well as in buildings and like stationary structures in which the principle or method of maintaining the temperature of the enclosed space below that of atmosphere remains the same although the structures may differ in detail.

The invention is herein disclosed as embodied in structure of the character to be utilized in moving vehicles such as an automobile, bus, railroad coach, etc.

The object of the invention broadly is to provide a new and unique method and means providing for circulating air in an enclosed space such as the body of an automobile, a room of a building, or other structure.

It is further an object and feature of the invention to provide a container for water in which is provided a porous water absorbent material. Such container may be constructed in the ceiling of an automobile or passenger coach or like structure or in the ceiling of the room of a building and air from atmosphere is caused to flow across the porous water absorbent material to produce a rapid evaporation of the water to thereby chill the container wall. Secondarily, air is caused to flow into the compartment from atmosphere to contact the under surface of the chilled container wall whereby the inflowing air is cooled and is subsequently mixed with the air in the enclosed space or compartment.

It is further an object of the invention to provide a vehicle such as an automobile or the like with a metal pan forming the ceiling of the body of the vehicle with a space between its top and the pan into which space air may flow through a slot in the forward end of the vehicle and pass out through a slot at the rear of the vehicle, the body being shaped to produce a partial vacuum at the opening at the rear of the vehicle to insure the drawing of air across the water container.

A further feature and object of the invention is to provide in such automobile or vehicle a valve controlled opening leading to the compartment of the vehicle below the water container whereby air in variable quantity may be caused to flow into the vehicle, means being provided to control the egress of air from the vehicle to thereby provide pressure slightly above atmosphere within the enclosed space.

A further object of the invention is to provide a chamber, one wall of which is formed by the container and the other wall of which is spaced therefrom and consists of a sheet of foraminous material, such for instance as fabric, which may correspond to the decorations of the compartment or room. Air is caused to flow from atmosphere into this space to contact with the chilled container wall and to pass through the foraminous sheet which acts as a means for distributing the inflowing air uniformly and prevents drafts. Air caused to flow into the space, as by movement of the vehicle or by other means, produces a pressure in this space and insures contact of the air with the cold surface and further insures passage of the chilled air through the fabric or foraminous sheet into the compartment.

These and other objects and various novel features of the invention are hereinafter more fully described and claimed, and the preferred form of construction of a vehicle cooling means embodying my invention is shown in the accompanying drawings in which—

Fig. 1 is an elevation showing an automobile in the interior of the top of which is provided my improved cooling means.

Fig. 2 is a longitudinal section taken through the top of the vehicle.

Fig. 3 is a cross section of the top taken on line 3—3 of Fig. 2.

Fig. 4 is a front elevation of the upper part of the top of the vehicle.

Fig. 5 is a section taken on line 5—5 of Fig. 1.

Fig. 6 is an enlarged section taken on line 6—6 of Fig. 5.

Fig. 7 is a partial section showing the cowl of the automobile and the associated parts.

Fig. 8 is a longitudinal section showing the preferred valve structure for controlling flow of air into the vehicle compartment.

Fig. 9 is a cross section thereof on line 9—9 of Fig. 8.

As heretofore stated, the invention is here shown as applied to an automobile but the same general construction is applicable to various structures for transportation of persons or goods such as railroad trains, busses and coaches of various types.

In the construction here shown, the automobile is provided with a metal body 1 having the usual doors 2, 3, a cowl 4, hood 5 and preferably a metal top 6. This top may be constructed as shown more particularly in Fig. 2 with the metal cross strips or ribs 7 for the sake of strength. Below the top 6 is a pan 8 spaced from the top providing an air space 9. The pan 8 has its ends and edges upturned as indicated at 10 at the forward end and 11 at the rear and forms a leakproof pan that provides the ceiling to the enclosed space of the vehicle, the upper portion of which is indicated at 12 in Fig. 2. There is a slot across the vehicle top at the front end indicated at 13 and shown in front elevation in Fig.

4. There is also a slot 14 at the rear end of the vehicle and in the construction shown, air sweeping downwardly over the top at the rear of the vehicle tends to draw air out of the slot or aperture 14. Thus, in movement of the vehicle, air tends to be driven into the slot 13 and to be withdrawn through the slot 14 providing for a rapid transfer of air through the air space 9 above the pan 8. Preferably, there is a pad 15 which may be formed of any appropriate, water absorbent, material that is not detrimentally affected by water, as for instance felt.

A porous and water absorbent material is of value in any character of installation of my improved cooling means and in case of installation in the automobile top, the pad prevents the water flowing from side to side or from forward to back due to inequalities of road surface. The pad may be saturated by means of a water hose discharging water into the aperture 13 for instance. Movement of the vehicle on the road surface creates a current of air entering the aperture 13, as indicated by the arrows in Fig. 2 and passing across the surface of the saturated pad to the exit aperture 14. This causes a rapid evaporation of the water from the pad and with a resultant chilling of the water and the bottom of the pan 8. Below the pan 8 is the ceiling proper of the compartment consisting of a foraminous sheet 8ª. This may be of any approved form but preferably is of fabric sufficiently loosely woven as to permit a fairly ready passage of air therethrough. This fabric may correspond in color with the interior of the compartment or be complemental to the color scheme of the compartment. This sheet 8ª is attached at its periphery to the walls or structure of the compartment and forms with the metal sheet 8 a chamber 16. This material 8ª, if of fabric, is preferably tied as by tie strips 8ᵇ to the sheet 8 to prevent it from sagging, the strips being of such character and so arranged as to permit air to freely flow throughout the space 16.

Air enters the chamber 16 through an opening 17 at the forward end of the vehicle and preferably at the center thereof as shown in Fig. 4. This opening leads into the vehicle just beneath the bottom of the pan 8 and into the chamber 16. The opening 17, as shown in Figs. 2 and 9, has a chamber 18 extending inwardly of the body being provided by the bottom wall 19 and upper wall 20. These walls are curved as at 21 and 22 and support a valve structure extending across the inner end of the chamber, it having a knurled operating handle end 24ª as shown in Fig. 8 and a body formed of the oppositely disposed spaced curved portions 23 and 24. These portions cross the exit opening 25 between the parts 21 and 22 and also the opening of the chamber 18 to the valve. By rotation of the handle 24 the curved valve plates 23 and 24 may vary the degree of opening and thus control the volume of air per unit of time discharging into the space 16 to contact with the chilled container wall. As this opening 17 is so positioned that rain may pass into it in the vehicle shown, I preferably provide a series of sheet metal strips 26 spaced apart as shown parallel with the direction of movement of the vehicle. These strips have curved portions 27 therein which cause the moisture carried by the atmosphere to be wiped out and to flow down the inclined wall 19 and out of the front of the vehicle in the construction as here shown.

Other means than the strips 26 may be provided to prevent rain from atmosphere passing into the compartment in any appreciable quantity or sufficient to wet the foraminous sheet 8ª. With this arrangement of foraminous sheet a uniform distribution of inflowing and chilled air is provided in the compartment and with entire absence of drafts. The pressure of the air flowing into the space 16 insures its contact with the container wall and its ready passage through the sheet 8ª.

It is one of the features of this invention that the automobile for instance may be driven with the body closed and thus to a material degree prevent external air from moving into the vehicle except through the grilled opening 17.

One of the features and objects of this invention is to provide an air conditioning means for a compartment by causing air from the exterior to flow into the compartment to contact with a chilled surface and under pressure and to provide a valve controlled outlet for air from the compartment so that the pressure may be maintained constant and drafts practically entirely avoided. It will be readily observed that, if the air flows into the chamber 16 in contact with the cooled surface it will tend to fall from the said surface along its entire under side and through the sheet 8ª as indicated by the arrows shown in the windows of the vehicle in Fig. 1.

In order that the air flow may be controlled, I provide a valve 32 in each post 33 on the opposite sides of the windshield, a portion of which is indicated at 34 in Fig. 6. This post may be solid or of metal as shown and has a passageway 35 therein opening toward the rear of the vehicle so that air flowing across the surface 36 of the vehicle body produces a slight vacuum at the discharge end 37 of the passageway 35 and tends to draw air out as well as permitting the same to flow by pressure within the vehicle.

The valve may be manipulated as by a handle 38 to vary the extent of the opening and thus control the rapidity of discharge of the atmosphere from the compartment. Thus it can be seen that, by variation of the valve member 21 in the air inlet to underneath the pan and by variation of the valves 32 which are preferably in each of the two pillars at the opposite sides of the windshield, the occupant may readily control the circulation of air in the compartment. Thus my improved cooling system contemplates the cooling of the air flowing from atmosphere into the compartment under pressure and to control the volume of flow per unit of time into the compartment and pressure that may be developed therein.

The theory of what I may term "pressure cooling" will be more clearly understood from the following:

When a person is at rest as in a car or in a room, about 400 B. t. u. per hour per person require to be dissipated, approximately 250 B. t. u. being sensible heat and about 150 B. t. u. being latent heat. The body of a person requires to be maintained at practically constant temperature 98.6 Fahrenheit and this is secured by a rather complex process of balancing heat production against heat loss. Heat is dissipated from the skin by radiation, conduction, convection and by evaporation of perspiration and as the surrounding air temperature approaches the body temperature, the amount of heat loss by radiation and convection decreases rapidly while the amount lost by evaporation of perspiration increases.

It is, of course, common knowledge that to secure satisfactory results in body cooling, it is necessary to have an air circulation. Where fans and other means for providing blasts of air are concerned, the body is usually not properly cooled as when the air strikes the surface of the body, only one portion of the body surface is in contact with the air stream and will be cooled while the remaining portion away from the air stream remains warm. Thus rapid circulation of air causing drafts in the enclosed space is quite unsatisfactory. I therefore have provided for what I have termed a "pressure system of cooling" and a means to avoid the drafts and to secure a constant change of air which is moving so slowly as not to be draft-like in character but still sufficiently rapid to maintain a constant transfer of heat from the body of a person through the skin.

I have also found that maintaining the vehicle body at a pressure slightly above atmospheric is advantageous since it prevents leakage inwardly of road dust, or the like. The intake of air to be cooled at a point high on the car avoids much dust, since dust is thicker close to the road.

By my improved pressure system of cooling and the control of the exhaust from the compartment, any desired degree of air circulation can be attained. The pressure developed of course, in so far as the automobile is concerned, will tend to vary with the varying speeds of the machine and may be controlled by controlling the rapidity of the exhaust as well as the volume of inflow per unit of time. Other systems in which the compartment is stationary will require other means for producing and controlling pressures but the fundamental principle will remain the same.

The foregoing description has been largely confined to the passenger compartment of an automobile but it is also highly desirable to cool the engine compartment and to prevent transmission of the heat developed in the engine compartment into the passenger compartment.

The cooling of the cowl compartment is accomplished by the means shown in Figs. 5 and 7, Fig. 5 being a cross section taken through the cowl on line 5—5 of Fig. 1 and Fig. 7 showing a longitudinal section of the cowl. It will be noted from these figures that the cowl indicated at 4 has the usual form and that within the cowl and spaced therefrom is a similar metal sheet 40 which is of the same general shape as the cowl and spaced therefrom providing a chamber 41 in which there is a porous pad 42 similar to the pad 15 in the top of the passenger compartment heretofore described. This sheet metal member 40, which, as shown, is secured to the cowl or sides of the car and to the wall 45, also stiffens the front part of the car and, like pan 8, forms a part of the strength members of the car. The cowl is provided with downwardly opening louvres 43 on each of the opposite sides formed in the outer sheet forming the cowl at a point above the lower edge of the chamber 41 as can be seen clearly in Fig. 5. Water may be injected into this space 41 saturating the pad 42 in the same manner as that heretofore described in respect to the pad 15 in the vehicle top. Air is caused to flow into this chamber 41 at the forward end and top thereof through the aperture 44 shown in Fig. 7. This aperture is in the wall 45 closing the cowl from the engine compartment which is at the left of Fig. 7 and this wall may have insulation material 46 on the cowl side. Air, of course, enters the engine compartment through the radiator (not here shown), and a portion thereof may pass into the chamber 41 at the top and is forced to flow downwardly on each of the opposite sides to discharge through the side apertures or louvres 43.

The apertures or louvres 43 may be positioned as indicated in Fig. 1 and lie at an angle to the horizontal or otherwise arranged as may be convenient. By this means the cowl is cooled independently of the body. This is desirable inasmuch as the air that is cooled at the top of the passenger compartment tends to fall and is drawn across the compartment through the outlets 37 in the two pillars on opposite sides of the windshield 34. In both cases the air in the compartment and in the cowl becomes chilled through the rapid evaporation of the water in the chambers 9 and 41 making the surfaces of the sheets 8 and 40 cold. In the cowl compartment is also provided a foraminous sheet 47 and air enters the chamber between the foraminous sheet 47 and the pan 40 through the ventilator opening controlled by the hinged plate 48 which is of the common construction operable from within the passenger compartment by means of the handle 49. This sheet 47 is attached at its periphery to the metal sheet 40 as will be understood particularly from Fig. 5 and is sustained in position by numerous fabric strips 50. This sheet in its spaced relation with the pan 40 as shown provides a closed chamber having an inlet and air passing thereinto, as by movement of the vehicle, is forced into contact with the ceiling and pan surface and passes through the fabric or foraminous sheet into the cowl.

The method herein disclosed is applicable for the cooling of rooms of buildings as well as cooling an automobile or other wheeled conveyance. Obviously, in the cooling of the room of a building, means must be provided for causing a flow of air into the compartment to be cooled.

It is pointed out that, in the method shown, the air from the atmosphere passes into the compartment through the aperture 17 for instance and this would tend to cause a pressure above atmospheric within the compartment. Air passes from the compartment at a distance from the surface as for instance through the apertures 37. By a proper proportioning of these apertures, or varying the position of the valves controlling the flow therethrough, pressure above atmosphere may be maintained within the compartment and the air pressure is varied somewhat according to the speed of the automobile. Thus, whether pressure is produced by the automobile moving through the air or by any other means the method of cooling the compartment will remain the same.

It is to be understood however, that the invention is not confined to the maintenance of pressure in the compartment being cooled as a reduction in the temperature of the atmosphere of a compartment will be produced due to the inflowing air losing its heat to the cold surface of the pan and then diffusing with the atmosphere of the compartment.

From the foregoing description, it will be evident that the various objects of the invention are attained by the construction described; that the method of cooling the compartment is broadly new as well as the construction of an automobile employing the method, and that, in so far as the automobile construction is concerned, the invention is of simple and inexpensive form, the automobile requiring little mechanical change as merely providing a second ceiling wall spaced from the outer top wall and openings provided to the atmosphere to and from the space between said walls and also to and from the compartment being cooled. In so far as the cowl is concerned, it requires but little change, merely making a double wall through which space air is discharged as described to chill the inner wall which tends to cool the air within the cowl.

It will also be evident from the foregoing that the equipment is materially less expensive than the usual refrigeration units heretofore employed for the purpose of cooling space and thus is of a character commercially practicable for the cooling of an automobile compartment.

Having thus described my invention, its utility and mode of operation, what I claim and desire to secure by Letters Patent of the United States is—

1. The method of providing cooled air in an enclosed space which consists in causing a rapid evaporation of a vaporizable liquid in contact with the outer face of a wall of the space to thereby chill the same, causing air from the atmosphere to flow into the space in a series of swirling streams to contact with the inner face of said chilled wall, and passing air from the space to the atmosphere at a point distant from the wall.

2. The method of providing cooled air in an enclosed space which consists in causing a rapid evaporation of a vaporizable liquid in contact with the outer surface of a wall of the space to thereby chill the same, causing air from the atmosphere to flow into the space in contact with the inner face of said chilled wall to diffuse with the air of the said space, and restricting the rate of flow of exhausted air passing from the space to a volume per unit of time less than that of the inflowing air to thereby produce a pressure in the space above atmospheric pressure.

3. In an automotive vehicle having a body, means for cooling the interior of the body comprising a compartment in the ceiling open to flow of air therethrough by movement of the vehicle, a water containing pan forming a part of the ceiling structure, movement of the air through the said compartment causing a rapid evaporation of the water and chilling of the pan, there being an aperture in the vehicle body immediately below the pan through which air may pass into the interior of the vehicle to contact with the pan, there being apertures for egress of air from the body to the atmosphere.

4. In a conveyance having a compartment for the transportation of persons or goods, means for cooling the compartment comprising a sheet of foraminous material forming the ceiling of the compartment, a wall thereabove, and a wall forming a top of the conveyance and spaced from the first named wall, a water saturated porous body in contact with the first named wall, there being apertures opening to the space between the top and first wall so arranged that air is caused to pass across the porous body to produce a rapid evaporation of the water and a consequent chilling of the said wall, there being an aperture provided at the forward end of the compartment whereby, through movement of the conveyance, air is caused to enter the compartment to contact with the chilled wall, and means for controlling the rapidity of movement of the air through the compartment to the atmosphere.

5. In a conveyance having a compartment for persons or goods, means for cooling the compartment comprising a chamber at the top of the conveyance for containing a vaporizable liquid, there being an opening in the front and to the rear of the chamber permitting air to flow therethrough by movement of the conveyance whereby the liquid is rapidly vaporized and the bottom wall of the chamber chilled, a foraminous sheet of material positioned in spaced relation with the said chamber wall, the periphery of which is connected with the walls of the compartment, there being an inlet aperture to the compartment at the front of the conveyance whereby air may be discharged thereinto by movement of the conveyance to contact with the chilled wall and thence through the foraminous sheet, the compartment having an air outlet.

6. In a conveyance having a compartment for persons or goods, means for cooling the compartment comprising a container for a vaporizable liquid, the wall of the compartment being so arranged that a flow of air is passed across the container by movement of the conveyance to thereby cause a vaporization of the liquid and consequent chilling of the wall of the container, a sheet of fabric positioned below the container in spaced relation therewith, there being an opening at the front of the compartment providing for a flow of air into the space between the fabric and the container, movement of the vehicle tending to cause air pressure in the space between the fabric and the container wall and providing practically uniform discharge of air throughout the area of the fabric into the compartment, and a valve controlled outlet for air in the compartment whereby the desired rapidity of circulation of the cooled air may be produced.

7. In a conveyance having a compartment for persons or goods, means for cooling the compartment comprising a container for water below the top of the compartment poviding a vaporizing chamber, the space between the container and the top being open to a flow of air therethrough by movement of the conveyance, a sheet of fabric positioned below the water container, the space between the fabric and the container being open to a flow of air thereinto by movement of the vehicle, the air contacting the container surface being chilled by the rapid evaporation and passing through the said fabric to the interior of the compartment, and means for controlling the rapidity of movement of the air through the compartment whereby a desired circulation of cooled air may be maintained.

8. In a conveyance having a compartment for transportation of persons or goods, means for maintaining cooled air in the compartment comprising means for causing evaporation of a liquid in contact with a wall in the ceiling of the compartment by movement of the conveyance whereby the said wall is chilled, a sheet of foraminous material in spaced relation with the said wall providing a chamber closed to the compartment except to the apertures of the foraminous material and open to a flow of outside air thereinto by movement of the conveyance to contact with the chilled wall and to be distributed and diffused with the atmosphere of the compartment in passing through the foraminous sheet, and means for causing egress of air from the compartment by movement of the conveyance.

9. In an automotive vehicle having a body compartment, means for cooling the interior of the compartment, comprising spaced walls in the top open to a flow of air therethrough by movement of the vehicle, the inner wall of the pair forming a water containing pan and movement of air between the said walls causing a rapid evaporation of the water and chilling of the pan surface, a foraminous sheet of material below the said pan surface, the automobile body compartment having an opening from the atmosphere leading to the space between the foraminous sheet and the pan surface whereby air passing into the space contacts the chilled surface and thence passes through the foraminous sheet to the interior of the body compartment to diffuse with the air of the compartment therebelow, said body compartment having an aperture for egress of air to the atmosphere.

10. Means for providing cooled air in an enclosed space having a top wall and side walls, comprising a metal wall below and in spaced relation with the top wall providing a water container, there being means for causing a flow of air through the said space to produce a rapid evaporation of the water and thereby chill the metal wall, a foraminous sheet of material extending between said side walls and spaced below the said metal wall and into which air from the atmosphere may be passed to contact with the chilled wall and to pass through the foraminous sheet to diffuse with the air of the said space, and means providing for the passage of air from the said space.

11. Means for providing cooled air in an enclosed space having a top wall and side walls comprising a metal wall below and in spaced relation with the top wall providing a water container, the space between the said walls being open to a flow of air there through to produce rapid evaporation of water and chill the metal wall, a sheet of fabric of a character to permit ready flow of air therethrough and spaced below the said metal wall providing a chamber closed to the said enclosed space by the fabric, there being a controllable aperture providing an inlet for air to the said space to contact with the metal wall and to pas through the fabric to diffuse with the air of the enclosed space, and means providing for a controlled flow of air from the said space.

12. Means for providing cooled air in the compartment of a vehicle for the transportation of persons or goods comprising means for chilling a wall of the compartment by evaporation of a vaporizable liquid, a foraminous sheet of material spaced from the said wall and secured at its periphery to the compartment walls, and means providing for a flow of air into the space between the said sheet and the chilled wall by movement of the vehicle, said sheet providing for uniform flow of the cooled air throughout the area of the sheet into the compartment.

13. Means for providing cooled air in the compartment of a vehicle for the transportation of persons or goods, comprising means for chilling a wall of the compartment by evaporation of a vaporizable liquid, a foraminous sheet of material forming with said chilled wall an air space, there being an opening from the atmosphere to the said space whereby movement of the vehicle causes a flow of air thereinto to contact the chilled wall and to pass through the foraminous sheet into the compartment.

14. The method of cooling and ventilating a motor vehicle compartment which comprises cooling the ceiling wall of the compartment, directing air from outside the compartment along the under side of the ceiling in close proximity thereto while generally and temporarily confining the incoming air to a layer along the under side of the ceiling, and withdrawing air from the compartment at a lower point in the latter.

15. The method of cooling and ventilating a motor vehicle compartment which comprises cooling the ceiling wall of the compartment, directing air from outside the compartment along the under side of the ceiling in close proximity thereto while generally and temporarily confining the incoming air to a layer along the under side of the ceiling, and withdrawing air from the compartment at a lower point in the latter but at a reduced rate so that the incoming air causes the air in the compartment generally to be under a little greater than atmospheric pressure.

16. In combination a motor vehicle having a compartment provided with an upper heat conducting wall or ceiling, means for cooling the ceiling, means providing a filtering and confining layer below and in spaced relation to the ceiling so as to thereby provide an air space between such means and the ceiling, and means for allowing air to enter such space during movement of the vehicle, from which it follows that the air will be cooled and then filtered as it passes downwardly through the filtering means.

17. In a conveyance having a compartment for the transportation of persons or goods, means for cooling the compartment comprising a metal sheet spaced from the wall of the conveyance thereabove and adapted to hold water, there being an aperture at the forward end of the conveyance to the space between the said elements and at the rear thereof for admission and egress of air caused to flow by movement of the conveyance to thereby chill the metal sheet by evaporation of the water, and a valve controlled inlet for directing air flowing into the compartment to contact with the metal sheet, there being apertures leading from the compartment to the atmosphere for egress of air.

18. Means for providing cooled air in a compartment comprising means for chilling a top wall of the compartment by evaporation of a vaporizable liquid, a sheet of fabric in spaced relation with the chilled wall and forming therewith a chamber, there being means provided for causing a flow of air into the said chamber to contact the chilled wall and flow through said fabric into the compartment, and said compartment having an opening permitting flow of air therefrom to the atmosphere.

19. In a vehicle having a substantially closed body for the transportation of persons or goods, means for cooling and ventilating said body comprising an inner impervious wall secured to an upper wall of said vehicle body in slightly spaced relation to form a shallow upper chamber separate from said body space, means in said upper chamber to hold an exposed supply of water, means for providing for a flow of air through said chamber and out into the atmosphere to chill the lower wall of said chamber by evaporation of said water, and means for producing a flow of outside air into said vehicle body into contact with said chilled chamber wall to be cooled thereby and an exhaust flow of air from said body to the atmosphere.

JOHN A. GERMONPREZ.